United States Patent [19]

Dickey

[11] 3,731,318
[45] May 1, 1973

[54] PAPER TRANSPORT STRUCTURE FOR RECORDER COMPRISING FOLDABLE FACE PLATE

[75] Inventor: K. Shirlan Dickey, North Ogden, Utah

[73] Assignee: Hewlett-Packard Company, Palo Alto, Calif.

[22] Filed: May 25, 1972

[21] Appl. No.: 256,859

[52] U.S. Cl. ..............346/145, 242/55.53, 312/39, 346/136
[51] Int. Cl. ............................................G01d 15/24
[58] Field of Search.....................346/145, 136, 68; 242/55.53; 312/39, 40, 41

[56] References Cited

UNITED STATES PATENTS 3,389,402  6/1968  Rosmanith.........................346/145 X
3,611,431  10/1971  Rosmanith ............................346/145

Primary Examiner—Joseph W. Hartary
Attorney—Stephen P. Fox

[57] ABSTRACT

A recorder utilizing a recording medium such as paper threaded over a front face plate where the recorded signals may be viewed, the front face plate being formed by two separate plate sections which may be folded at a central region to produce an opening in the front of the recorder for loading and unloading the paper supply roll. The mechanical linkage for moveably supporting the face plate sections on the recorder chassis also carries a moveable paper supply support structure, the support structure moving forwardly as the front plate is folded such that the access to the supply roll support is substantially enhanced. The threading path for the paper is extremely simple with the two face plate sections in the folded condition, the unfolding operation of the face plate sections serving to carry the paper into engagement with the paper drive mechanism. The paper drive mechanism remains in engagement with the main drive train during the paper loading operation.

18 Claims, 5 Drawing Figures

Patented May 1, 1973
3,731,318
2 Sheets-Sheet 1
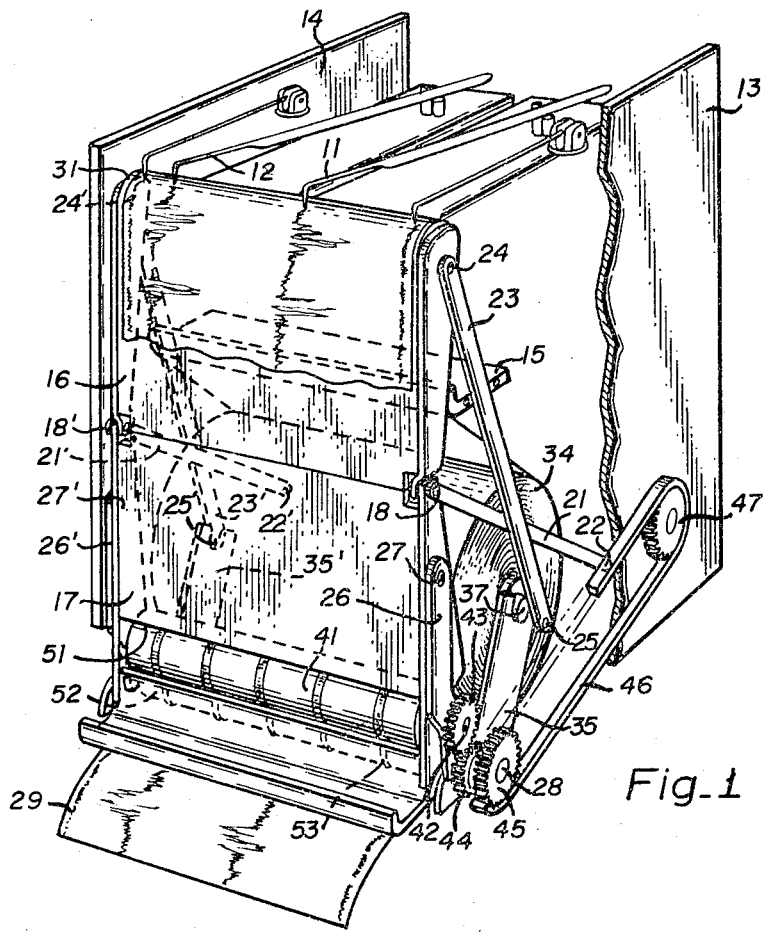
Fig_1
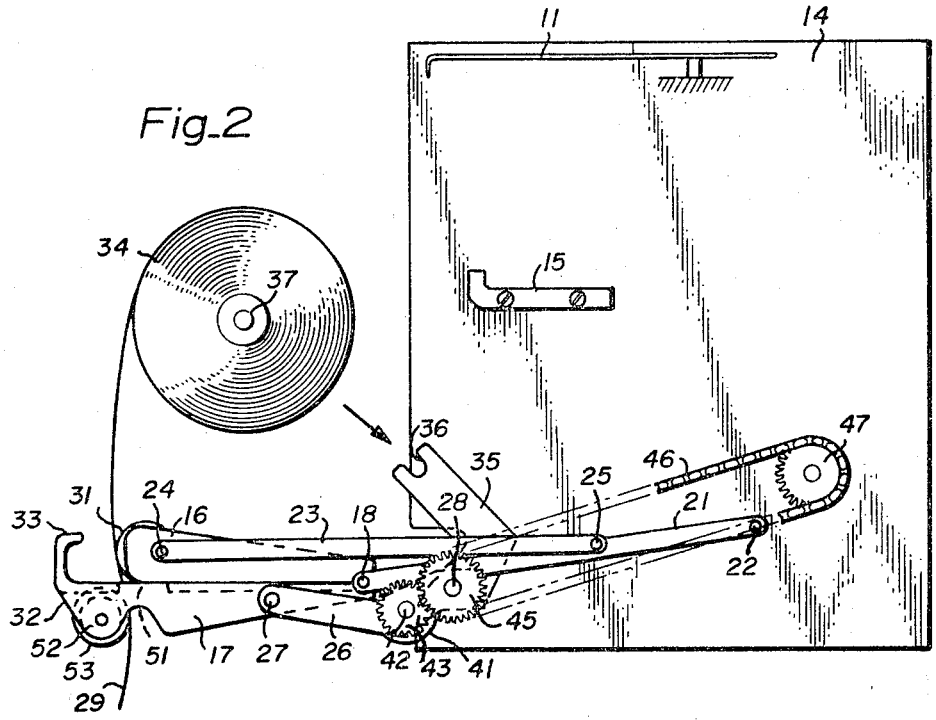
Fig_2

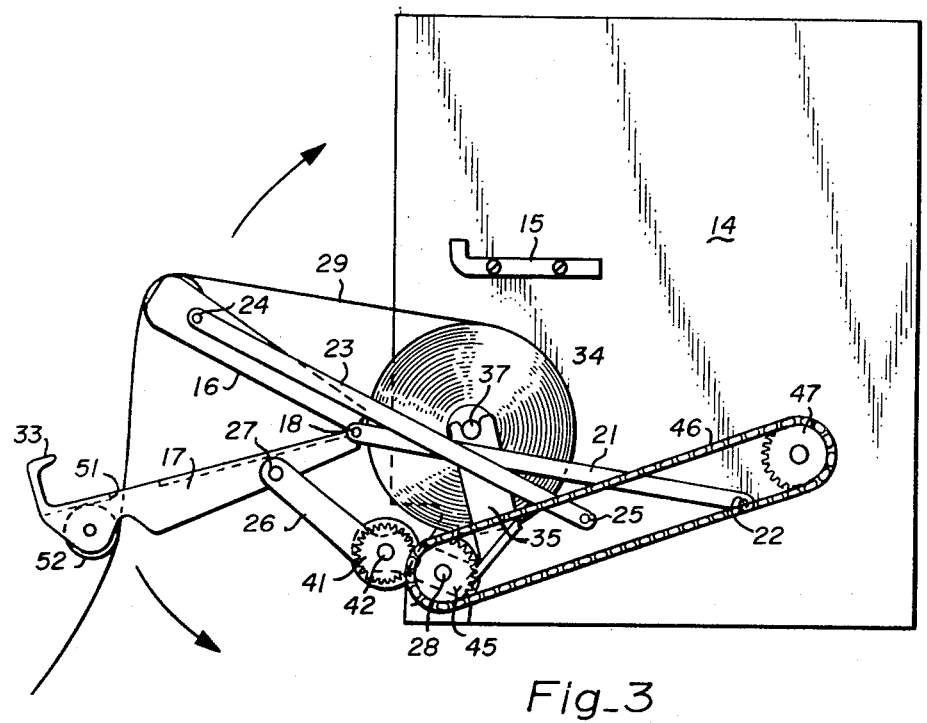
Fig_3
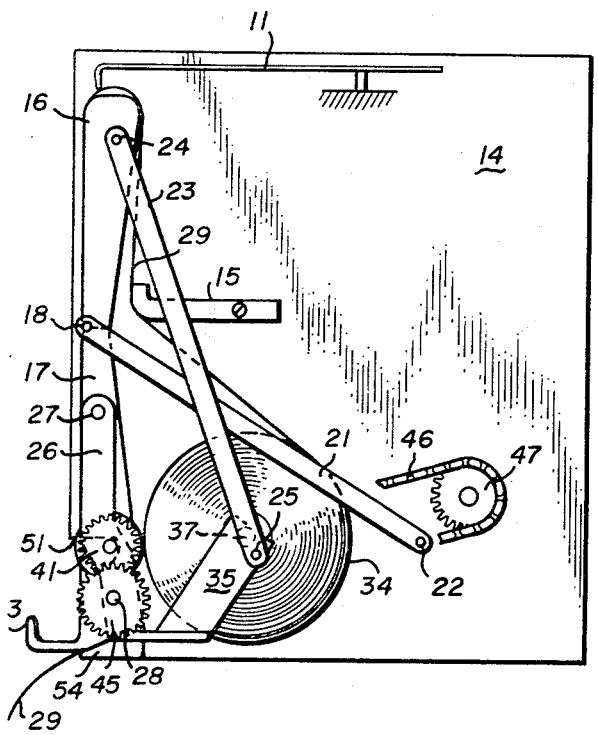
Fig_4
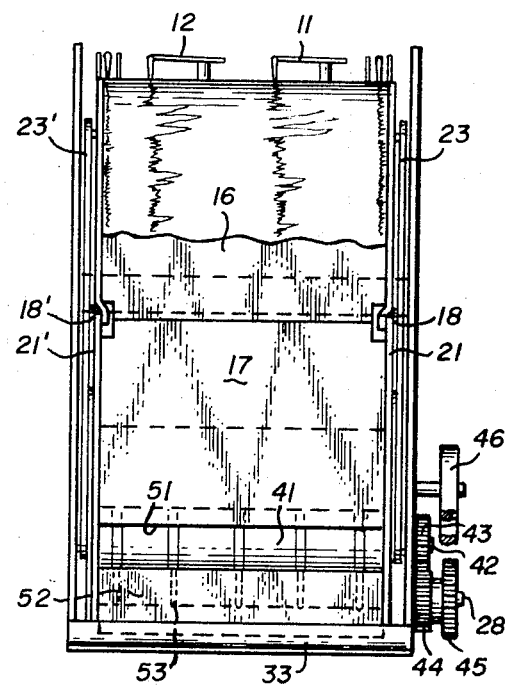
Fig_5

PAPER TRANSPORT STRUCTURE FOR RECORDER COMPRISING FOLDABLE FACE PLATE

BACKGROUND OF THE INVENTION

Various forms of electronic recording instruments such as oscillographs utilize paper and moveable writing pens or heat sensitive paper and moveable heater arms or the like for recording the electrical signals on the recording medium. The recording medium or paper is generally fed through the recorder from a supply roll or Z-fold pack in such a manner that the signals recorded on the paper may be viewed by the operator at the same time or shortly after the imprint is recorded. Thus, in many such recorders the paper is driven across a front or face plate in the recorder after the signals have been recorded on the paper, and this face plate is moveable or slideable from the recorder chassis to permit access to the paper supply carried in the chassis behind the face plate. In these known forms of front loading recorder the size of the paper supply roll is limited by the size of the opening that is provided in the front of such recorders for manually removing and replacing the paper rolls. Where techniques are used other than front loading, such as side or top loading, complex types of racks and rollers limit the size of the paper supply that can be utilized. Where the recorder is loaded from the top or the bottom rather from the front, complications arise from the interference produced by the position of the recording pens and/or the electronic circuit components of the recorder. In all of these known devices, whether front loading, side loading or top or bottom loading, the threading of the paper across the recording surface or edge on which the pens ride, past the viewing face plate and through the paper drive mechanism is complicated and requires time consuming effort on the part of the operator. Other recorder structures seeking to eliminate complicated threading and/or increase the paper supply, result in the protrusion of the paper drive and/or transport mechanisms outside the normal limits of the recorder cabinet or chassis, or cause the recorder to be unusually tall and cumbersome.

BRIEF SUMMARY OF THE PRESENT INVENTION

The present invention provides a novel front loading type of paper transport mechanism for a recorder wherein the face plate over which the paper travels comprises two face plate sections pivotally coupled together near the mid-section of the face plate, the two sections being foldable together by a simple mechanical linkage support mechanism to provide an enlarged opening in the front of the recorder for access to the paper roll carrying mechanism behind the face plate, this enlarged opening as well as the limited size of the simple support mechanism behind the face plate resulting in a substantial cavity within the recorder for supporting a large paper supply roll. In addition, the novel folding face plate sections provide a very simple threading path for the paper to be threaded off the roll, over the recording edge surface, down the face plate, and through the paper drive mechanism. The mechanical support linkage for the face plate also serves to carry the support mechanism for the paper roll, this support mechanism moving forward when the face plate sections are folded to enhance the accessability of the paper support mechanism to the operator during loading and unloading of the paper supply. The paper drive mechanism is carried by the face plate support apparatus such that the drive mechanism rotates downward, providing an enlarged cavity opening, and yet remains in engagement with the main drive mechanism mounted in the recorder chassis during the folding operation of the face plate and the removal, replacement, and threading of the paper through the drive mechanism.

DESCRIPTION OF THE DRAWINGS

FIG. 1 is a front perspective view partially cut away showing the paper transport mechanism of a typical form of oscillograph with the paper in position for recording.

FIG. 2 is a side view of the paper support and transport mechanism with the two-section front face plate in the folded position to provide access to the paper support structure carried by the transport mechanism.

FIG. 3 is a side view of the transport mechanism illustrating the condition of the paper transport structure after the paper has been loaded thereon and threaded through the support mechanism, and the face plate partially returned to its normal position closing the front of the recorder chassis.

FIG. 4 is a side view of the paper transport with the paper loaded therein, threaded through the mechanism, and the face plate in the final position closing the front of the chassis.

FIG. 5 is a front view of the oscillograph with the paper loaded therein.

DESCRIPTION OF THE PREFERRED EMBODIMENT

Referring now to the drawings, the novel paper transport mechanism of the present invention is shown as embodied in a two-channel, oscillograph unit provided with the two recording markers or pens 11 and 12; the recorder elements including the electronic components of this unit are not shown since they are unnecessary for an understanding of the paper transport mechanism. The chassis comprises two side walls 13 and 14 securely affixed together by a cross-plate 15. The two section face plate is mounted on the two side walls 13 and 14 by means of a rectilinear mechanical linkage assembly having similar components on either side of the face plate and in the following description elements coupled to the side wall 14 will bear the same reference numerals primed as the reference numerals of the elements coupled to the side wall 13. The face plate comprises a top or upper plate section 16 and a bottom or lower plate section 17 pivotally coupled to the upper plate section 16 at the central junction region by means of two small pivot pins 18, 18' extending through integral mounting tabs on the two sides of the two plate sections.

The mechanical linkage for mounting the two plate sections 16 and 17 on the side walls comprises a pair of central arms or bars 21 and 21' which are pivotally coupled at one end to the two plate sections at the central pivot pins 18, 18' and pivotally mounted at their opposite ends on the two side walls 13 and 14 by pivot pins 22 and 22', respectively. A second pair of arms 23 and 23' is pivotally coupled at one end to the two sides of the top plate section 16 near the upper portion thereof via pivot pins 24, 24' and at the other end the arms are pivotally coupled by pivot pins 25, 25' to the two side walls 13 and 14, respectively, at points slightly below and forward of the location of the first coupling pins 22, 22'. A third pair of arms 26, 26' is coupled to the bottom plate section 17 at pivot pins 27, 27', the other ends of the two arms being pivotally coupled to the side walls via the drive gear shaft 28 extending through side wall 13 and a pivot pin axially aligned with said shaft 28 and carried in the other wall 14, respectively.

This mechanical linkage therefore comprises two sets of four bar linkages, the upper set including the two pairs of bars 21, 21' and 23, 23', the lengths between the two pairs of pivot pins 18, 24 and 18', 24' in the top plate section 16, and the lengths between the two pairs of pivot pins 22, 25 and 22', 25' in the side walls. The lower four-bar linkage set comprises the common bars 21, 21', the third bars 26, 26', the lengths between the two pairs of pivot pins 18, 27 and 18', 27' in the lower plate section 17, and the lengths between the axis of the drive shaft 28 and the pivot pins 22, 22' in the side walls.

During the normal recording operation the top and bottom plate sections 17, 17' are positioned normal to the side walls and extend over the front of the chassis as shown in FIGS. 1, 4 and 5, the two plate sections 16 and 17 forming a substantially plane surface across the front of the instrument over which the recorder paper 29 travels from top to bottom. The two plate sections 16 and 17 may be moved on the mechanical linkage so as to fold the two plate sections at the two pivot pins 18, 18' at the central junction region, the upper edge 31 of the top plate section 16 and the lower edge 32 of the bottom plate section 17 moving in an outwardly direction, the two plate sections being folded together and being lowered to the bottom level of the chassis as shown in FIG. 2. The position of the two plate sections 16 and 17 and the mechanical linkage at the mid-point of the folding operation are shown in FIG. 3. The lower edge of the bottom plate section 17 is provided with a lip 33 by which the lower plate section may be grasped by the operator and pulled forward to produce the plate folding action. It can be seen that with the plate folded into the position at the lower portion of the chassis, a large opening is produced in the front of the chassis for the insertion and removal of the roll of paper 34 to be loaded into the device.

A pair of paper roll support legs 35, 35' are provided integral with each of the two lower arms 26, 26', respectively, the two legs extending in a generally vertical direction and being provided with U-shaped recesses 36 in their upper ends to accommodate the shaft 37 of the paper roll. With the plate structure in the folded condition shown in FIG. 2, these two paper support legs 35, 35' are rotated with arms 26, 26' to a forward position with the legs extending in a forward direction and the two recesses 36 being positioned near the front surface of the chassis. This permits ease in the loading of the paper roll 34 into the two recesses 36 of the support leg as illustrated in FIG. 2. As the two plate sections 16 and 17 are unfolded to return the plate to form the plane surface shown in FIGS. 1 and 4, the two support legs 35, 35' are pivoted in a rearward direction, carrying the paper roll 34 back into the cavity region within the chassis behind the face plate.

The paper drive mechanism comprises a paper drive roller 41 mounted on a shaft 42 extending between the two lower arms 26, 26', the roller shaft 42 being provided with a driven gear 43 fixedly secured thereto and extending on the outside of the side wall 16 where it meshes with a drive gear 44 carried on the drive shaft 28 rotatably mounted in the side wall 16. This drive gear 44 is integrally formed with a larger drive gear 45 which is provided with teeth meshing with the drive chain 46 driven via gear 47 from a suitable electric motor and transmission or the like (not shown) carried in the rear portion of the chassis, the motor being positioned so as to provide a large cavity area in the forward section of the chassis for accommodating the large paper supply roll 34. By pivoting the lower or inner ends of the two arms 26, 26' on the axis of the shaft 28 of the main drive gear 44, the axis of drive roller gear 43 will rotate with a constant radius about the axis of the main drive gear 44 and thus the roller drive gear 43 will remain meshed with the teeth of the main drive gear 44 as the face plate is moved from the flat extended position shown in FIGS. 1 and 4 to the folded position shown in FIG. 2. Since the drive gears are always meshed during paper roll loading and unloading, there is no problem with drive gear misalignment produced during this operation.

The lower portion of the lower plate section 17 is provided with an opening 41 extending across the section, a pressure roller 52 being rotatably mounted in the plate section 17 behind this opening. The pressure roller 52 is provided with a plurality of spaced apart resiliant rings 43 such as O-rings, the O-rings being pressed against the drive roller 41 when the bottom plate section 17 is positioned to form the plane surface shown in FIGS. 1 and 4. The axis of the pressure roller 52 is slightly behind the axis of the drive roller 41, i.e. slightly to the rear thereof, and the resiliance of the O-rings provides a snap-shut or over center lock action between the two rollers as the two plate sections 16 and 17 are brought to the normal flat position shown in FIG. 4. This resiliant pressure action between the pressure and drive rollers keeps the plate structure firmly locked in the normal position shown in FIG. 4, yet allows the two plate sections to be moved into their folded position shown in FIG. 2 by a slight pull on the lip portion 33 of the lower plate section. Additional latching means such as bullet latches can be utilized if desired to hold the face plate in the normal position.

The threading of the paper through the paper transport mechanism is extremely simple as can be seen in FIGS. 2 and 3. The lower plate section 17 is slightly longer than the upper plate section 16 as shown in FIG. 2 such that the rounded upper edge 31 of the top plate section 16 is closely aligned with the upper surface of the pressure roller 52, i.e. the right side of the roller 52 as seen in the folded position of FIG. 2 and the upper side when the plate section 17 is moved to the normal position of FIG. 4. Thus, the paper roll 34 may be placed on the support legs 35 and the paper 29 threaded from the roll 34 and down past the upper edge 31 of the top plate section 16 and through the opening 51 in the bottom plate section 17 and next to the pressure roller 52 as clearly seen in FIG. 2. Then the two plate sections 16 and 17 are unfolded to their normal position shown in FIG. 4. During the unfolding operation, the pressure roller 52 carries the lower portion of the paper 29 in against the drive roller, the pressure roller firmly pressing the paper against the drive roller 41 so that the drive roller 41 in rotating pulls the paper off of the paper supply roll 34, the paper being fed past the paper guide formed by the edge of plate 15, over the rounded upper edge surface 31 of the upper plate section 16 where the recording is made thereon by the pens 11 and 12, down over the face plate, in through the opening 51 and between the two rollers 41 and 52, and over a lower paper guide 54 behind the two rollers and then out the front of the chassis.

As can be seen from the above description, the folding face plate provides a very large egress and ingress opening in the front of the recorder so that very large paper supply rolls may be inserted therein. Since the leg supports for the paper roll move forward and are conveniently exposed for loading the paper roll and the operator need not reach into the chassis, maximum size rolls may be used. The threading of the paper across the face plate and through the paper drive mechanism is extremely simple since the paper path is provided with unobstructed and large openings for the passage of the paper, and the movement of the face plate section from the folded to the normal position serves to move the paper under the pens and also into the drive mechanism. Problems with misalignment of the paper drive mechanism during loading and unloading of the paper supply are eliminated due to the fact that the drive gears remain meshed during the entire cycle. It can be seen that, during the normal operation of the recorder with the paper in place and also during the loading and unloading operation, the only mechanism extending from either side of the chassis is the drive gear mechanism. Also, the loading mechanism does not drop below the lower edge of the instrument and it can therefore be loaded while sitting on a flat table or surface. Although the preferred embodiment disclosed use with a paper supply roll, it is obvious that this structure could be easily adapted for use with Z-fold paper supply.

I claim:

1. A paper feed apparatus comprising:
    a pair of side walls;
    a face plate including a top plate section and a bottom plate section, said two sections being pivotally coupled together at a central junction region at the lower edge of said top section and the upper edge of said bottom section;
    mechanical linkage means for movably mounting said face plate sections on said side walls with said two face plate sections forming a substantially plane surface normal to said side walls in a first position, said two sections being foldable at said central junction region by movement of said mechanical linkage such that the upper edge of the top plate section and the lower edge of the bottom plate section move outwardly from the plane surface of the face plate, and two face plate sections folding toward each other to expose the region behind the face plate;
    means for supporting a supply of paper in the region behind the foldable face plate, the paper being threaded over the top edge of the top plate section and down over the front surface of the face plate sections; and
    paper drive means at the lower edge region of the bottom plate section for engaging and driving said paper.

2. A paper feed apparatus as claimed in claim 1 wherein said paper drive means includes a drive roller rotatably mounted on said mechanical linkage means, a pressure roller mounted on said bottom plate section for pressing the paper against said drive roller when said two plate sections are moved to form the face plate in the first position, and motor driven means coupled to said drive roller.

3. A paper feed apparatus as claimed in claim 2 wherein said mechanical linkage means includes a pair of arms, one on each side of the face plate, said arms being pivotally coupled at one end to the sides of the bottom plate section and pivotally mounted at the other end to the side walls, said drive roller being rotatably mounted on said pair of arms.

4. A paper feed apparatus as claimed in claim 3 including a pair of support legs carried on said pair of arms and supporting said paper supply, said support legs being moved in a forwardly direction by said arms as the bottom and top plate sections are folded together to thereby carry the paper supply forward, said support legs being moved in a rearward direction by said arms as the two plate sections are returned to the normal position.

5. A paper feed apparatus as claimed in claim 1 wherein said paper drive means includes drive roller means rotatably mounted on said mechanical linkage and motor drive means engaging said drive roller means for driving said roller, said drive roller means remaining engaged with said motor drive means as said mechanical linkage moves during movement of said face plate sections from said normal position to said folded position and return.

6. A paper feed apparatus as claimed in claim 5 wherein said drive roller means includes a drive gear and wherein said motor drive means includes a main gear meshing with said drive gear, said gears remaining meshed during said mechanical linkage movement.

7. A paper feed apparatus as claimed in claim 5 wherein said drive means includes a pressure roller mounted on said bottom plate section for pressing the paper against said drive roller when said two plate sections are moved to form the face plate in said first position, said pressure roller moving away from said drive roller when said two plate sections are moved to the folded position.

8. A paper feed apparatus as claimed in claim 7 wherein said bottom plate section is longer than said top plate section such that the lower edge portion of said bottom plate section extends beyond the upper edge portion of said top plate section when the two plate sections are folded together, said pressure roller being mounted in the extended lower edge portion of said bottom plate section whereby the paper threaded over the upper edge of said top plate section is also threaded behind said pressure roller when the two plate sections are in the folded position.

9. A paper feed apparatus as claimed in claim 5 wherein said mechanical linkage means includes a pair of arms, one on each side of the face plate, said arms being pivotally coupled at one end to the sides of the bottom plate section and pivotally mounted at the other end to the side walls, said drive roller being rotatably mounted on said pair of arms.

10. A paper feed apparatus as claimed in claim 9 including a pair of support legs carried on said pair of arms and supporting said paper supply, said support legs being moved in a forwardly direction by said arms as the bottom and top plate sections are folded together to thereby carry the paper supply forward, said support legs being moved in a rearward direction by said arms as the two plate sections are returned to the normal position.

11. A paper feed apparatus as claimed in claim 1 wherein said mechanical linkage means comprises arm assemblies on either side of said face plate, each arm assembly comprising;
- a first arm pivotally mounted at one end to a first pivot point in the associated side wall and pivotally coupled to said central junction region of said top and bottom plate sections;
- a second arm pivotally mounted at one end to a second pivot point in said associated side wall and pivotally coupled to the side of said top plate section; and
- a third arm pivotally mounted at one end to a third pivot point in said associated side wall and pivotally coupled to the side of said bottom plate section.

12. A paper feed apparatus as claimed in claim 1 wherein said paper drive means includes a drive roller rotatably mounted on said third arm, a pressure roller mounted on said bottom plate section for pressing the paper against said drive roller when said two plate sections are moved to form the face plate in the first position, and motor driven means coupled to said drive roller.

13. A paper feed apparatus as claimed in claim 12 including support legs carried on each of said third arms and supporting said paper supply, said support legs being moved in a forwardly direction by said arms as the bottom and top plate sections are folded together to thereby carry the paper supply forward, said support legs being moved in a rearward direction by said arms as the two plate sections are returned to the normal position.

14. A paper feed apparatus as claimed in claim 11 wherein said paper drive means includes drive roller means rotatably mounted on said third arms and motor drive means engaging said drive roller means for driving said roller, said drive roller means remaining engaged with said motor drive means as said third arms move during movement of said bottom face plate section from said normal position to said folded position and return.

15. A paper feed apparatus as claimed in claim 14 wherein said drive roller means includes a drive gear and wherein said motor drive means includes a main gear meshing with said drive gear, said gears remaining meshed during said mechanical linkage movement.

16. A paper feed apparatus as claimed in claim 14 wherein said drive means includes a pressure roller mounted on said bottom plate section for pressing the paper against said drive roller when said two plate sections are moved to form the face plate in said first position, said pressure roller moving away from said drive roller when said two plate sections are moved to the folded position.

17. A paper feed apparatus as claimed in claim 16 wherein said bottom plate section is longer than said top plate section such that the lower edge portion of said bottom plate section extends beyond the upper edge portion of said top plate section when the two plate sections are folded together, said pressure roller being mounted in the extended lower edge portion of said bottom plate section whereby the paper threaded over the upper edge of said top plate section is also threaded behind said pressure roller when the two plate sections are in the folded position.

18. A paper feed apparatus as claimed in claim 14 including a pair of support legs carried on said third arms and supporting said paper supply, said support legs being moved in a forwardly direction by said arms as the bottom and top plate sections are folded together to thereby carry the paper supply forward, said support legs being moved in a rearward direction by said arms as the two plate sections are returned to the normal position.

* * * * *